United States Patent [19]

Suzuki et al.

[11] Patent Number: 5,018,130
[45] Date of Patent: May 21, 1991

[54] HIGH-SPEED OPTICAL PACKET SWITCHING SYSTEM USING OPTICAL BUFFER BETWEEN INCOMING AND OUTGOING CHANNELS

[75] Inventors: Syuji Suzuki; Hiroshi Suzuki, both of Tokyo, Japan

[73] Assignee: NEC Corporation, Tokyo, Japan

[21] Appl. No.: 370,192

[22] Filed: Jun. 22, 1989

[30] Foreign Application Priority Data

Jun. 23, 1988 [JP] Japan ................... 63-156126

[51] Int. Cl.$^5$ ............................................ H04J 14/00
[52] U.S. Cl. ...................................... 370/1; 455/600
[58] Field of Search ............... 370/1, 3, 4, 50, 70; 455/600

[56] References Cited

U.S. PATENT DOCUMENTS

| | | | |
|---|---|---|---|
| 4,710,914 | 12/1987 | Robieux | 370/3 |
| 4,873,681 | 10/1989 | Arthurs | 455/608 |
| 4,894,818 | 1/1990 | Fujioka | 370/3 |

FOREIGN PATENT DOCUMENTS

| | | | |
|---|---|---|---|
| 0096893 | 5/1986 | Japan | 370/4 |
| 2113049 | 7/1983 | United Kingdom | 370/1 |

OTHER PUBLICATIONS

Day et al., "Applications of Self-Routing Switches to Lata Fiber Optic Networks", (ISSS, 1987), pp. 0519–0523.
P. Gonet et al., "Asynchronous Time-Division Switching: The Way to Flexible Broadband Communication Networks", (Zurich Seminar, 1986), pp. 141–148.
J. Turner, "New Directions in Communications (or Which Way to the Information Age?)", (Zurich Seminar, 1986), pp. 25–32.
H. Kobrinski et al., "An Optoelectronic Packet Switch Utilizing Fast Wavelength Tuning", Bell Communications Research (GLOBCOM '88), pp. 948–953.
Kai Y. Eng, "A Photonic Knockout Switch for High-Speed Packet Networks", (GLOBCOM, 1987), pp. 47.2.1–47.2.5.

Primary Examiner—Reinhard J. Eisenzopf
Assistant Examiner—L. Van Beek
Attorney, Agent, or Firm—Foley & Lardner

[57] ABSTRACT

In an optical packet switching system, a plurality of first wavelength tunable devices are connected respectively to incoming line terminals. In response to an incoming signal at the associated incoming line terminal, each of the first wavelength tunable devices generates an optical packet of a particular wavelength determined by a first wavelength selection signal supplied from a controller. In one embodiment, packets from the first wavelength tunable devices are switched through one or more paths set up by an optical space division switch to one of a plurality of optical buffers. Second wavelength tunable devices are respectively coupled to the outputs of the optical buffers for detecting a packet of a desired wavelength in response to a second wavelength selection signal from the controller and applying the detected packet to one of outgoing line terminals. Each of the optical buffers is made up of an optical coupler having parallel waveguides one of which is disposed in the signal transmission path, the other being disposed in an optical loop for recirculating a packet.

12 Claims, 9 Drawing Sheets

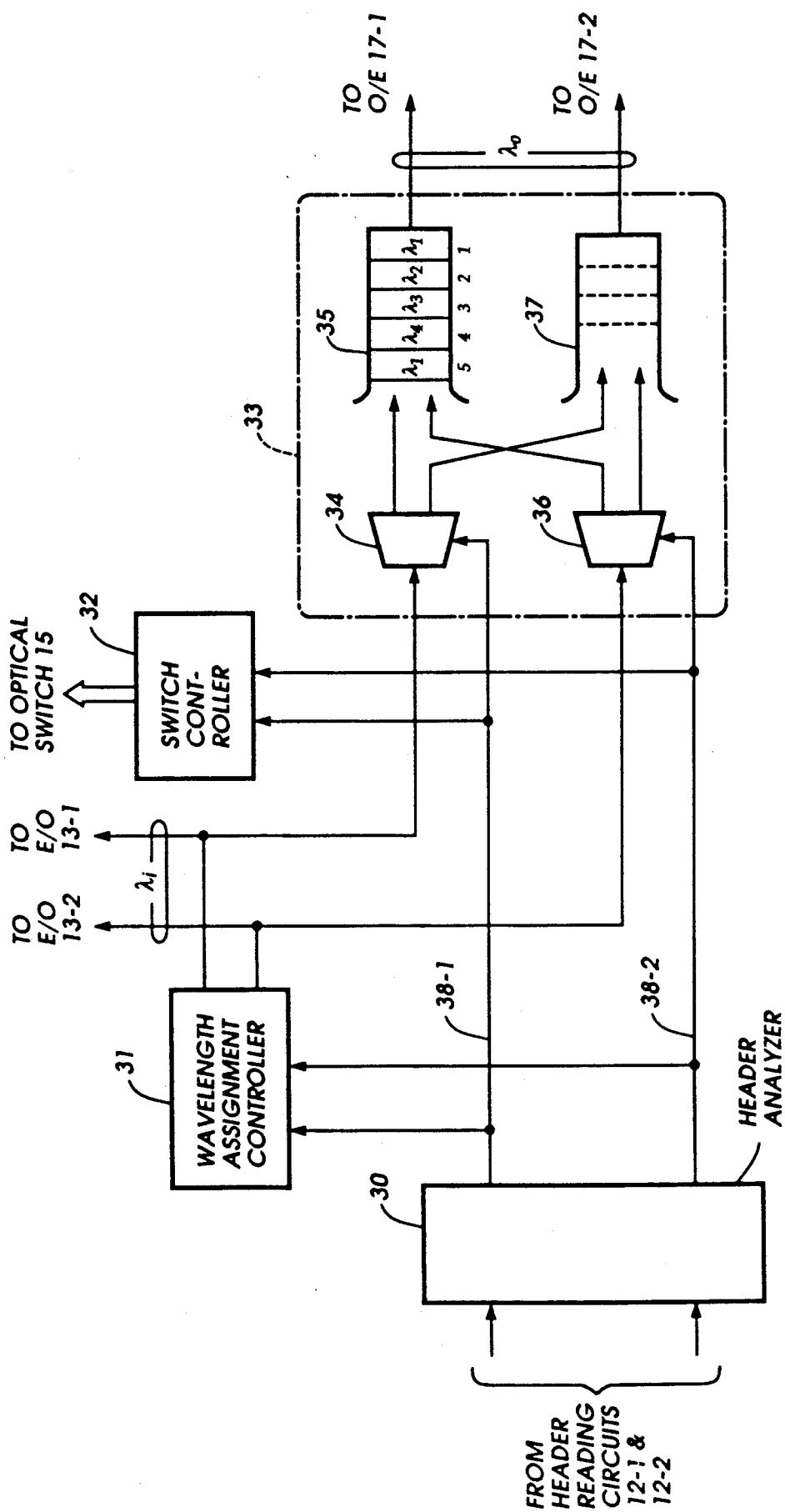

HIGH-SPEED OPTICAL PACKET SWITCHING SYSTEM USING OPTICAL BUFFER BETWEEN INCOMING AND OUTGOING CHANNELS

BACKGROUND OF THE INVENTION

The present invention relates to an optical packet switching system capable of operating at a super high switching speed in the range from several hundred megabits per second to several gigabits per second.

The following documents are available as prior art super high speed packet switching systems:

Document 1. "Application of Self-Routing Switches to LATA Fiber Optic Networks" Chet Day et al. (ISSS '87).

Document 2. "Asynchronous Time-Division Switching: The way to flexible broadband communication networks" P. Gonet et al. (Zurich Seminar '86)

Document 3. "New Directions in Communications" J. S. Turner (Zurich Seminar '86)

Document 4. "A Photonic Knockout Switch for High-Speed Packet Networks" Kai Y. Eng. (GLOBCOM '87)

Documents 1 to 3 disclose systems in which packet switching is hardware-implemented using parallel processors to permit switching of high speed multiplexed packet signals at speeds of 100 to 300 megabits per second which is carried by each circuit served by the system.

However, these switching systems employ electronics technology and therefore have inherently limited switching speeds, switching capacity and power consumption, thus failing to provide compatibility with the increasing transmission speed of optical transmission mediums. Thus, the prior art techniques are almost incapable of meeting the need for serving many circuits with a speed of several gigabits if the electronic technology is pursued in the development of high speed switching.

On the other hand, document 4 proposes the use of photonic technology for implementing packet switching. The use of photonic technology in a circuit switching system has already been proposed. Also proposed is the use of wavelength division multiplexing technology for implementing a compact space division switching network. The use of wavelength division multiplexing technology is also proposed by document 4 as a means for transferring packets from input ports to output ports to implement high speed packet switching.

However, in packet switching systems, buffers are required to store packets contending for the same output port in addition to the transfer function. The buffers employed in the system proposed in document 4 are of electronics type, thus requiring translation between optical and electrical signals. As a result, the amount of energy dissipated by the electronic buffers is substantial and the electronic operating speed of the buffers has an inherent limit which prevents the servicing of many circuits that carry packets of more than 1 gigabit per second.

SUMMARY OF THE INVENTION

It is therefore an object of the present invention to provide a a packet switching system with the use of optical buffers, rather than by the use of electronic buffers to overcome the power consumption and speed limitations problems.

According to the broadest aspect of the present invention, an optical packet switching system comprises a wavelength selection stage responsive to destination of an incoming packet for selecting a wavelength parameter from a plurality of wavelength parameters. The wavelength selection stage includes a first wavelength tunable device for converting the incoming packet to an optical packet having a wavelength corresponding to the selected wavelength parameter and multiplexing a plurality of such optical packets to generate a wavelength and time division multiplexed (WTDM) signal in response to receipt of a plurality of such incoming packets. An optical buffer is provided for storing the WTDM signal. A wavelength detection stage is responsive to destinations of incoming packets for rearranging a plurality of the selected wavelength parameters. The wavelength detection stage includes a second wavelength tunable device for detecting optical packets corresponding to the incoming packets from the stored WTDM signal in accordance with the rearranged wavelength parameters.

According to a first specific aspect of the present invention, an optical packet switching system comprises a plurality of first wavelength tunable devices connected respectively to incoming line terminals for supplying an optical packet of a selected wavelength to an optical space division switch in response to a first wavelength selection signal. A plurality of optical buffers are connected respectively to output ports of the optical space division switch for storing wavelength division multiplexed packets. The space division switch establishes one or more paths from outputs of the first wavelength tunable devices to inputs of the optical buffers in response to a path selection signal. A plurality of second wavelength tunable devices are connected respectively between outputs of the optical buffers and outgoing line terminals. Each of the second wavelength tunable devices is capable of detecting an optical packet of a desired wavelength from the stored wavelength division multiplexed packets, the wavelength of the detected optical packet being determined by a second wavelength selection signal. A controller is provided for generating the first and second wavelength selection signals and the path selection signal in accordance with a destination address contained in the incoming signal.

According to a second specific aspect, the optical packet switching system of this invention comprises a plurality of first wavelength tunable devices associated respectively with incoming line terminals for generating an optical packet of a selected wavelength in response to receipt of an incoming signal at the incoming line terminals, the desired wavelength being determined by a first wavelength selection signal. A plurality of optical buffers are respectively connected to outputs of the first wavelength tunable devices for storing wavelength division multiplexed packets. A plurality of second wavelength tunable devices connected respectively to outputs of the optical buffers for detecting an optical packet of a desired wavelength from the stored wavelength division multiplexed packets, the wavelength of the detected optical packet being determined by a second wavelength selection signal. An optical space division switch establishes one or more paths from outputs of the second wavelength tunable devices to the outgoing line terminals in response to a path selection signal. A controller generates the first and second wavelength selection signals and the path selection signal in accordance with a destination address contained in the incoming signal.

According to a third specific aspect, the optical packet switching system of the present invention comprises a plurality of first wavelength tunable devices associated respectively with the incoming line terminals for generating an optical packet of a selected wavelength in response to receipt of an incoming signal at the incoming line terminals, the desired wavelength being determined by a first wavelength selection signal. The output packets from the first wavelength tunable devices are combined to produce a wavelength multiplexed signal and applied to an optical buffer in which the wavelength division multiplexed packets are stored. The output of the optical buffer is split into a plurality of optical paths which are coupled to respectively to a plurality of second wavelength tunable devices. Each of the second wavelength tunable devices detects a packet of a desired wavelength from the stored wavelength division multiplexed packets in response to a second wavelength selection signal and supplies a replica of the detected packet to outgoing line terminals.

Preferably, the optical buffer comprises an optical coupler having first and second optically coupled waveguides, the first waveguide being connected at one end thereof to the optical space division switch and connected at the other end thereof to the input of an associated one of the second wavelength tunable devices. An optical loop is connected between opposite ends of the second waveguide to permit copies of a packet travelling through the first waveguide to be coupled to and recirculate through the loop and appear at the other end of the first waveguide.

BRIEF DESCRIPTION OF THE DRAWINGS

The present invention will be described in further detail with reference to the accompanying drawings, in which:

FIG. 2 shows details of the controller of FIG. 1;

DETAILED DESCRIPTION

Figures 1, 1A:
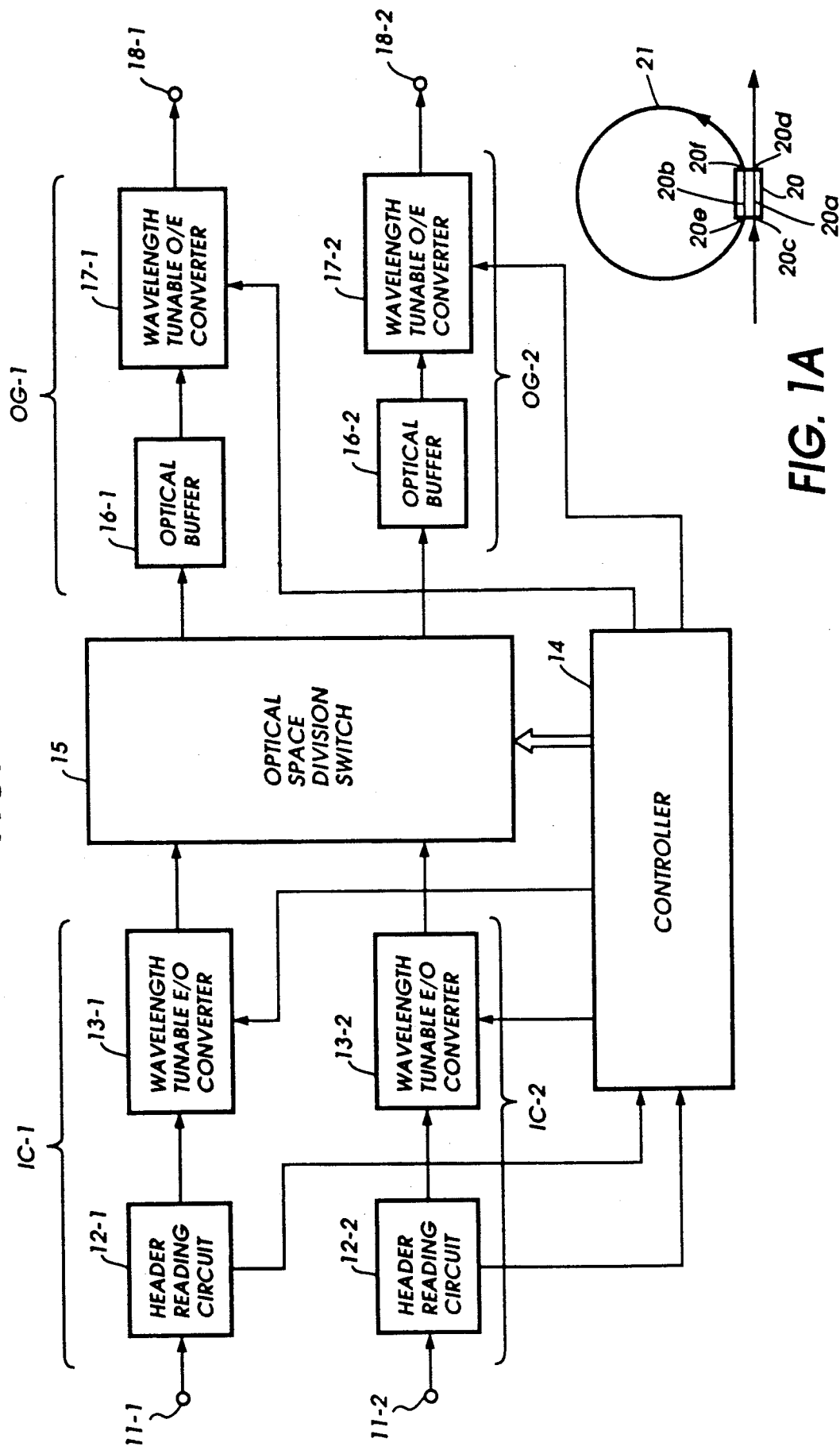
FIG. 1 is a block diagram of an optical packet switching system according to a first embodiment of the present invention.
FIG. 1A shows details of the optical buffers of FIG. 1.

Referring now to FIG. 1, there is shown an optical packet switching system according to a first embodiment of the present invention. The system comprises a plurality of incoming channels and a plurality of outgoing channels. For purposes of simplicity, only two incoming channels IC1 and IC2 and two outgoing channels OG1 and OG2 are shown. Each of the incoming channels includes a header reading circuit 12 and a wavelength tunable electrooptic converter 13. Header reading circuit 12 is connected to an incoming line terminal 11 to read the header field of each incoming packet of the length equal to or smaller than a time slot period. The incoming packet is an electrical signal and arrives at the incoming line terminal 11 in synchronism with the slot timing of the system. Control data contained in the header of each incoming packet is supplied from each header reading circuit 12 to a controller 14 and information data contained in the rest of the packet is supplied to the associated wavelength tunable electrooptic converter 13 where the electrical packet signal is converted to an optical packet of a wavelength determined by a wavelength selection signal supplied from the controller 14. Details of the electrooptic converters 13 are described in "An Optoelectronic Packet Switch Utilizing Fast Wavelength Tuning", H. Kobrinski et al, Bell Communications Research, (GLOBCOM '88).

An optical space division switch 15 is provided to establish optical paths between incoming channels and outgoing channels in accordance with path selection signals from the controller 14.

Each outgoing channel comprises an optical buffer 16 and a wavelength tunable optoelectric converter 17. As will be described in detail later, the optical buffer 16 of each outgoing channel forms a queueing loop to allow packets to be recirculated through it and extracted from an appropriate time slot. The wavelength tunable optoelectric converter 17 of each outgoing channel provides the extraction of packets of a particular wavelength from the associated optical buffer 16 in accordance with a wavelength selection signal from the controller 14 and converts the optical packet signal to a corresponding electrical signal for application to an outgoing line terminal 18. Details of the wavelength tunable optoelectric converters 17 are also described in the GLOBCOM '88 document just referred to above.

As illustrated in FIG. 1A, each of the optical buffers 16-1 and 16-2 is comprised of an optical coupler 20 and an optical fiber 21. Optical coupler 20 has first and second parallel waveguides 20a and 20b which extend respectively from first and second input ports 20c, 20e of the coupler 20 to first and second output ports 20d, 20f thereof. The first input port 20c is connected to a corresponding output terminal of the optical switch 15 to pass optical packets from the switch 15 through the first waveguide 20a to the first output port 20d and thence to the associated wavelength tunable optoelectric converter 17. Optical fiber 21 is coupled between the second output port 20f to the second input port 20e to form an optical queueing loop with the second waveguide 20b to introduce an integral multiple of the time slot period. Optical coupling between the first and second waveguides 20a and 20b causes a portion of the energy of a packet traveling through the first waveguide to be transferred to the second waveguide and recirculate through the loop 21 and repeatedly appear at the first output port 20d with a stepwisely reduced optical intensity. The rate of the intensity reduction is determined by the coupling ratio between the first and second waveguides 20a and 20b. If the coupling ratio is 1:1, one-half of the energy of a packet traveling through one of the waveguides is transferred to the other and a copy of the packet successively appear at the first output port 20d with one-half of the intensity of one preceding it.

FIG. 2 is block diagram of the controller 14 of FIG. 1. Controller 14 includes a header analyzer 30 connected to the header reading circuits 12-1 and 12-2 of all incoming channels IC1 and IC2 to examine the destination address contained in the header extracted from each incoming packet and determine to which one of the outgoing channels OG1 and OG2 the packet is destined. If the outgoing channel OG1 is the destination channel, header analyzer 30 activates an output line 38-1 which is connected to a wavelength assignment controller 31, a switch controller 32 and a switch 34 of a packet scheduling circuit 33. Conversely, if the packet is destined to the other channel, it activates an output line 38-2 which is connected to a switch 36 of the scheduling circuit 33 as well as to the controllers 31 and 32.

Wavelength assignment controller 31 has a wavelength management table which is mapped to record the busy/idle status of wavelengths available for the outgoing channels OG1 and OG2 and assigns an idle wavelength to an incoming packet and updates the wavelength management table. Wavelength assignment controller 31 applies a wavelength selection signal representing the assigned wavelength to the one of the wavelength tunable electrooptic converters 13-1 and 13-2 from which the packet header is received. As viewed from the input side of the optical buffers 16-1 and 16-2, the selection signal is a "wavelength write-in" signal $\lambda_i$ which controls the appropriate electrooptic converter 13 so that it converts the incoming electrical packet signal to an optical packet signal having the same wavelength as determined by the controller 14.

Switch controller 32 controls the space division switch 15 to establish a path between the incoming and outgoing channels in accordance with the logic states of lines 38-1 and 38-2. Thus, an optical packet of a particular wavelength is passed through the switch 15 and incident on one of the optical buffers 16-1 and 16-2, producing a series of copies of the packet which appear at the input of the associated one of the wavelength tunable optoelectric converters 17-1 and 17-2.

The switches 34 and 36 of scheduling circuit 33 receive wavelength selection signals from the controller 31 for selectively coupling to first-in-first-out buffers 35 and 37 depending on the logic states of lines 38-1 and 38-2. Specifically, the wavelength write-in signals $\lambda_i$ applied to either of the switches 34 and 36 is switched to buffer 35 when the outgoing channel OG1 is the destination channel, and switched to buffer 37 if the outgoing channel OG2 is the destination channel. In this way, different wavelength control signals $\lambda_i$ may form a queue in each of the buffers 35 and 37 in accordance with the order of arrival of the associated packets and in accordance with their destinations. The write-in signals stored in buffers 35 and 37 are respectively forwarded in sequence to wavelength tunable O/E converters 17-1 and 17-2 as "wavelength read-out" signals $\lambda_o$ to read optical packets of appropriate wavelengths out of the associated buffers.

Figure 3:
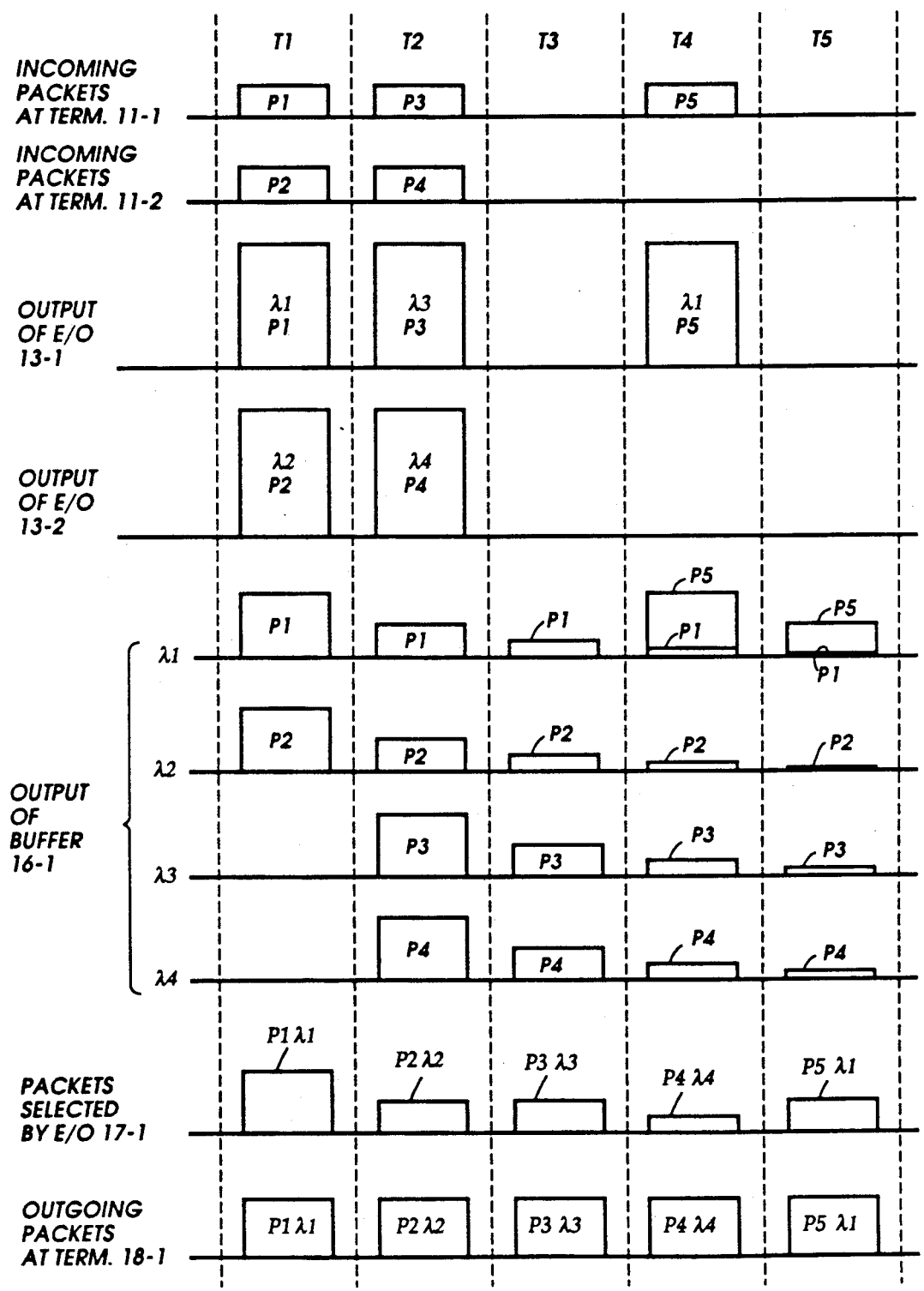
FIG. 3 is a timing diagram associated with the first embodiment.

The operation of the first embodiment of the invention can best be understood with reference to FIG. 3. Assume that incoming packets P1, P3 and P5 arrived respectively on time slots T1, T2 and T4 at incoming line terminal 11-1 and packets P2 and P4 arrived respectively on time slots T1 and T2 at incoming line terminal 11-2, and all of these packets are destined to the outgoing channel OG1. It is further assumed that wavelength assignment controller 31 has assigned $\lambda_1$, $\lambda_2$, $\lambda_3$ and $\lambda_4$ to packets P1, P2, P3 and P4, respectively, and $\lambda_1$ to packet P5. Wavelength tunable E/O converter 13-1 thus converts the incoming packets P1, P3 and P5 to optical packets of wavelengths $\lambda_1$, $\lambda_3$ and $\lambda_1$, respectively, and wavelength tunable E/O converter 13-2 converts the packets P2 and P4 to optical packets of wavelengths $\lambda_2$ and $\lambda_4$, respectively. The header analyzer 30 of controller 14 supplies a logic 1 to output line 38-1 and a logic-0 to output line 38-2 so that space division switch 15 establishes paths from the E/O converters 13-1 and 13-2 to optical buffer 16-1, and the switches 34 and 36 of scheduling circuit 33 are switched to apply the wavelength control signals from both outputs of controller 31 to buffer 35.

At the output of optical buffer 16-1, there appear a plurality of series of packets of four wavelengths $\lambda_1$, $\lambda_2$, $\lambda_3$ and $\lambda_4$ as shown in FIG. 3. The wavelength $\lambda_1$ series contains copies of the packet P1 incident on buffer 16-1 that appear on time slots T1 to T5 and copies of the incident packet P5 that appear on time slots T4 and T5. The first copy of P1 of wavelength $\lambda_1$ on time slot T1 has one-half the intensity of the incident packet P1, and the second to fifth copies of P1 of $\lambda_1$ on time slots T2, T3, T4 and T5 respectively have intensities ¼, ⅛, 1/16 and 1/32 of that of the incident packet P1. The intensity of the first copy of P5 of $\lambda_1$ on time slot T4 has one-half the incident intensity, but much higher than that of the fourth copy of P1 of $\lambda_1$ and the intensity of the second copy of P5 of $\lambda_1$ on time slot T5 has ¼ of that of the incident intensity, but much higher than the intensity of the fifth copy of P1.

The wavelength $\lambda_2$ series contains copies of the incident packet P2 that appear on time slots T1 through T5 with intensity characteristics identical to those of the copies of packet P1. The wavelength $\lambda_3$ series contains copies of packet P3 that appear on time slots T2 to T5 and likewise, the wavelength $\lambda_4$ series contains copies of packet P4 that appear on time slots T2 to T5.

Wavelength selection signals $\lambda_1$, $\lambda_2$, $\lambda_3$, $\lambda_4$ and $\lambda_1$ are sequentially stored into the first to fifth time slot positions of buffer 35 and sequentially forwarded to tunable O/E converter 17-1 as shown in FIG. 3. As a result, packets P1 of $\lambda_1$, P2 of $\lambda_2$, P3 of $\lambda_3$, P4 of $\lambda_4$ and P5 of $\lambda_1$ are selected by the converter 17-1 in sequence on time slots T1 to T5, respectively, and converted to electrical packet signals and appropriately amplified so that they have equal amplitudes at outgoing line terminal 18-1.

Figure 4:
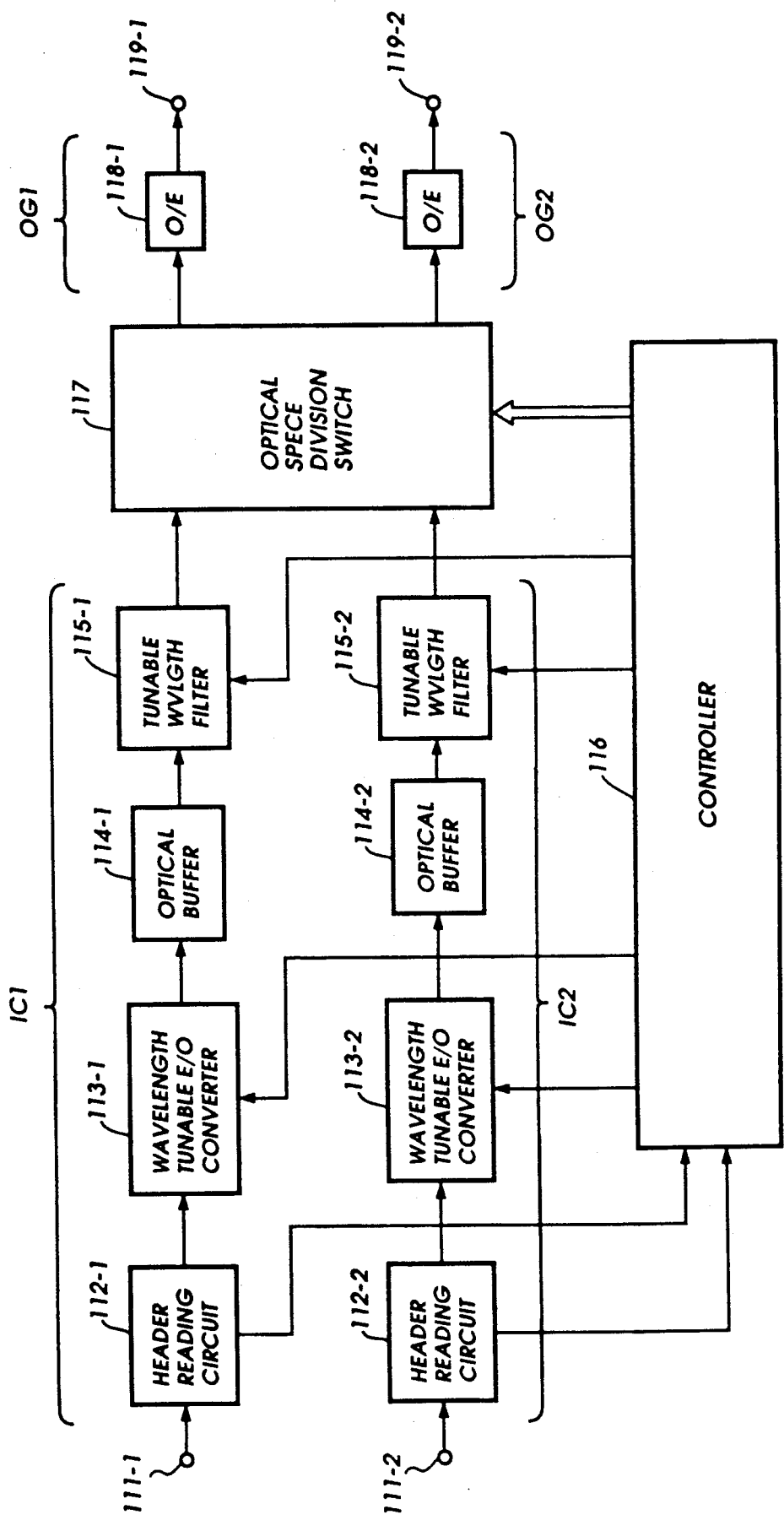
FIG. 4 is a block diagram of an optical packet switching system according to a second embodiment of the present invention.

A second embodiment of the present invention is shown in FIG. 4. In this embodiment, each of the incoming channels IC1 and IC2 comprises a header reading circuit 112, a wavelength tunable E/O converter 113, an optical buffer 114 and a tunable wavelength filter 115, and each of the outgoing channels OG1 and OG2 includes an optoelectric converter 118. Header reading circuit 112 is connected to an incoming line terminal 111 to read the header field of each electrical incoming packet arriving thereat in synchronism with the slot timing of the system. Control data in the packet header is supplied from each header reading circuit 112 to a controller 116 and information data of the packet is supplied to the associated wavelength tunable electrooptic converter 113 where the electrical packet signal is converted to an optical packet of a wavelength determined by a "wavelength write-in" signal supplied from the controller 116.

Optical buffer 114 of each incoming channel is identical to those shown in FIG. 1. A packet queueing loop is formed by each buffer 114 to allow packets to be recirculated through it and extracted from an appropriate time slot by the tunable wavelength filter 115 connected to it in response to a "wavelength read-out" signal from the controller 116.

An optical space division switch 117 establishes optical paths between incoming channels and outgoing channels in accordance with path selection signals supplied from the controller 116.

Each of the outgoing channels OG1 and OG2 comprises an electrooptic converter 118 for converting switched optical packets to corresponding electrical signals for application to an outgoing line terminal 119.

Figure 5:
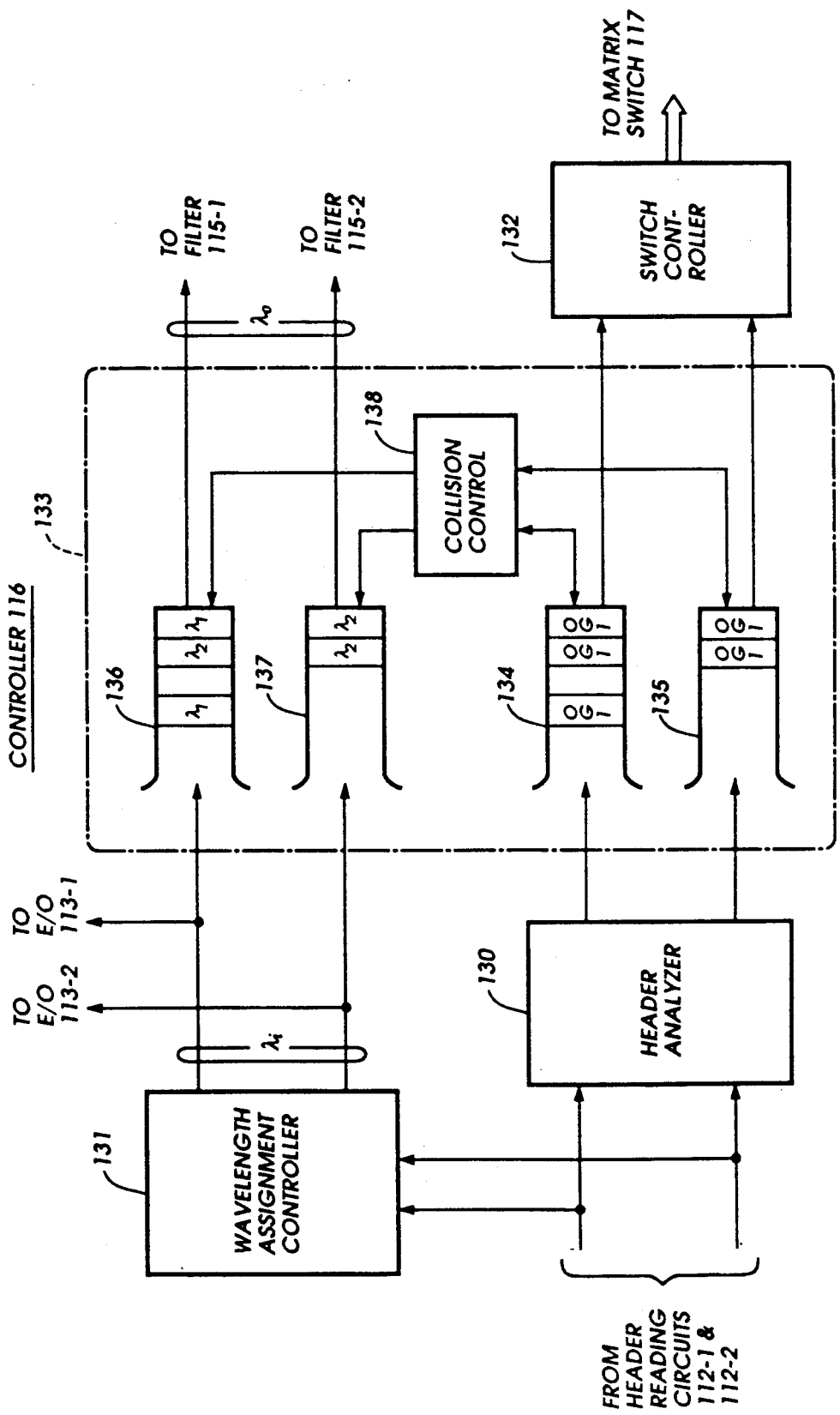
FIG. 5 shows details of the controller of FIG. 4.

As shown in detail in FIG. 5, the controller 116 comprises a header analyzer 130, a wavelength assignment controller 131, a switch controller 132 and a packet scheduling circuit 133. Packet scheduling circuit 133 includes buffers 134 and 135 connected to the outputs of header analyzer 130, buffers 136 and 137 connected to the outputs of wavelength assignment controller 131, and a collision controller 138. The outputs of buffers 134 and 135 are coupled to the switch controller 132 and those of buffers 136 and 137 are respectively coupled to wavelength filters 115-1 and 115-2. Buffers 134 and 135 are respectively associated with incoming channels IC1 and IC2 for storing OG identifiers supplied from header analyzer 130 and buffers 136 and 137 are associated respectively with incoming channels IC1 and IC2 for storing wavelength read-out signals supplied from wavelength assignment controller 131.

Header analyzer 130 examines the destination address contained in the packet header extracted from an incoming packet on each incoming channel and determines to which one of the outgoing channels OG1 and OG2 the packet is destined.

Wavelength assignment controller 131 determines which one of the incoming line terminals a given incoming packet has arrived at and maps the busy/idle status of wavelengths available for the incoming channels IC1 and IC2 in a table and assigns an idle wavelength to that given incoming packet. A wavelength write-in signal $\lambda_i$ representative of the assigned wavelength is generated by the controller 131 and applied to one of the wavelength tunable electrooptic converters 113-1 and 113-2 to which the given packet is applied from the incoming line terminal.

If the header of a given packet is supplied from packet reading circuit 112-1 and the outgoing channel OG1 is the destination channel of the given packet, for example, header analyzer 130 supplies an OG1 identifier to buffer 134 and wavelength assignment controller 131 supplies a wavelength write-in signal to E/O converter 113-1 and buffer 136.

Collision controller 138 is connected to buffers 134 and 135 to detect if there is more than one OG identifier in the same time slot position. This indicates that there is more than one packet contending for the same outgoing channel. If this is the case, controller 138 selects one of OG identifiers and forwards it to the switch controller 132 and forwards a wavelength read-out signal from one of buffers 136 and 137 that corresponds to the OG identifier forwarded to the switch controller 132.

Figure 6:
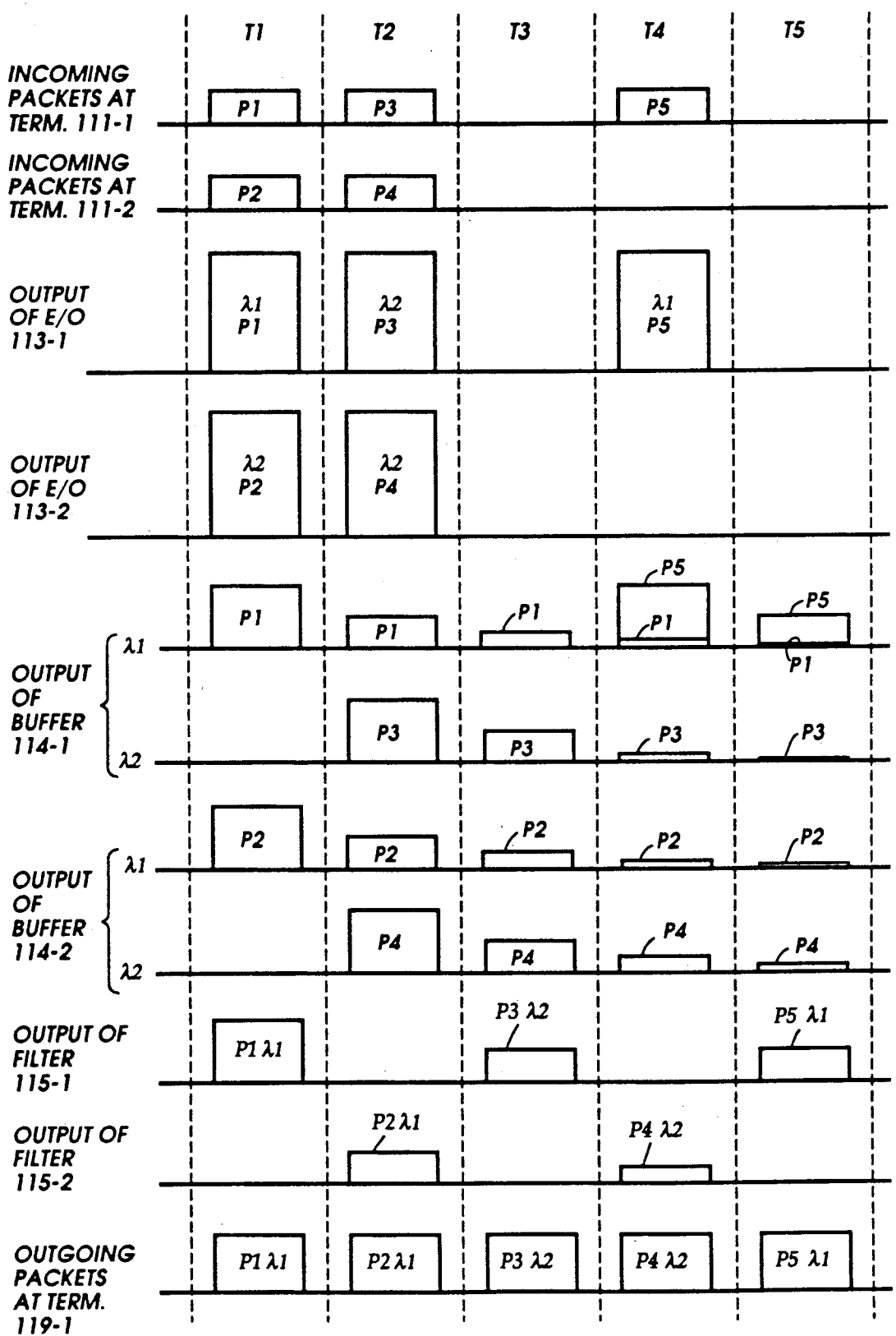
FIG. 6 is a timing diagram associated with the second embodiment.

The operation of the second embodiment of the invention can best be understood with reference to FIG. 6. Assume that incoming packets P1, P3 and P5 arrived respectively on time slots T1, T2 and T4 at incoming line terminal 111-1 and packets P2 and P4 arrived respectively on time slots T1 and T2 at incoming line terminal 111-2, and all of these packets are destined to the outgoing channel OG1. It is further assumed that wavelength assignment controller 131 has assigned $\lambda_1$ to P1, $\lambda_2$ to P2, $\lambda_2$ to P3, $\lambda_2$ to P4 and $\lambda_1$ to P5. Wavelength tunable E/O converter 113-1 thus converts the incoming packets P1, P3 and P5 to optical packets of wavelengths $\lambda_1$, $\lambda_2$ and $\lambda_1$, respectively, and wavelength tunable E/O converter 113-2 converts the packets P2 and P4 to optical packets of the same wavelength $\lambda_2$.

At the output of each of optical buffers 114-1 and 114-2, there appear two of series of packets of four wavelengths $\lambda_1$ and $\lambda_2$ as shown in FIG. 6. The wavelength $\lambda_1$ series at the output of optical buffer 114-1 contains copies of the packet P1 incident on buffer 114-1 that appear on time slots T1 to T5 and copies of the incident packet P5 that appear on time slots T4 and T5. The first copy of P1 of wavelength $\lambda_1$ on time slot T1 has one-half the intensity of the incident packet P1, and the second to fifth copies of P1 of $\lambda_1$ on time slots T2, T3, T4 and T5 respectively have intensities $\frac{1}{4}$, $\frac{1}{8}$, 1/16 and 1/32 of that of the incident packet P1. The intensity of the first copy of P5 of $\lambda_1$ on time slot T4 has one-half the incident intensity, but much higher than that of the fourth copy of P1 of $\lambda_1$ and the intensity of the second copy of P5 of $\lambda_1$ on time slot T5 has $\frac{1}{4}$ of that of the incident intensity, but much higher than the intensity of the fifth copy of P1. The wavelength $\lambda_2$ series at the output of optical buffer 114-1 contains copies of the incident packet P3 that appear on time slots T2 through T5 with intensity characteristics identical to those of the copies of packet P1.

On the other hand, the wavelength $\lambda_1$ series at the output of optical buffer 114-2 contains copies of packet P2 that appear on time slots T1 to T5 and, likewise, the wavelength $\lambda_2$ series contains copies of packet P4 that appear on time slots T2 to T5.

As shown in FIG. 5, outgoing channel identifiers OG1 are stored in the first, second and fourth time slot positions of buffer 134 and in the first and second time slot positions of buffer 135. On the other hand, wavelength selection signals $\lambda_1$, $\lambda_2$ and $\lambda_1$ are respectively stored in the first, second and fourth time slot positions of buffer 136 and wavelength selection signals $\lambda_2$ are stored in the first and second time slot positions of buffer 137.

Since the first and second time slot positions of buffers 134 and 135 are filled with the same outgoing channel identifiers, collision controller 138 detects that packets P1 and P2 are contending for the same outgoing channel and packets P3 and P4 are contending for the same outgoing channel, and forwards the identifier OG1 for packet P1 from the first time slot position of buffer 134 first, and then the other contending identifier for packet P2 from the first slot position of buffer 135. Subsequently, it forwards the identifier OG1 for packet P3 from the second time slot position of buffer 134 and then the other contending identifier for packet P4 from the second time slot position of buffer 135. Meanwhile, the wavelength selection signals stored in buffers 136 and 137 are supplied to wavelength filters 115-1 and 115-2 corresponding to those stored in buffers 134 and 135.

On sequentially receiving the outgoing channel identifiers, the switch controller 132 controls the optical space division switch 117 to establish optical paths from the outputs of wavelength filters 115-1 and 115-2 to the input of O/E converter 118-1.

As a result, packets P1 of $\lambda_1$, P3 of $\lambda_2$, and P5 of $\lambda_1$ are selected by wavelength filter 115-1 on time slots T1, T2 and T5, respectively, and packets P2 of $\lambda_1$ and P4 of $\lambda_2$ are selected by wavelength filter 115-2 on time slot T2 and T4, respectively, and multiplexed at the input of O/E converter 118-1. Electrical packet signals P1 ($\lambda_1$), P2 ($\lambda_1$), P3 ($\lambda_2$), P4 ($\lambda_2$) and P5 ($\lambda_1$) of equal amplitudes are generated by O/E converter 118-1 for application to outgoing line terminal 119-1.

Figure 7:
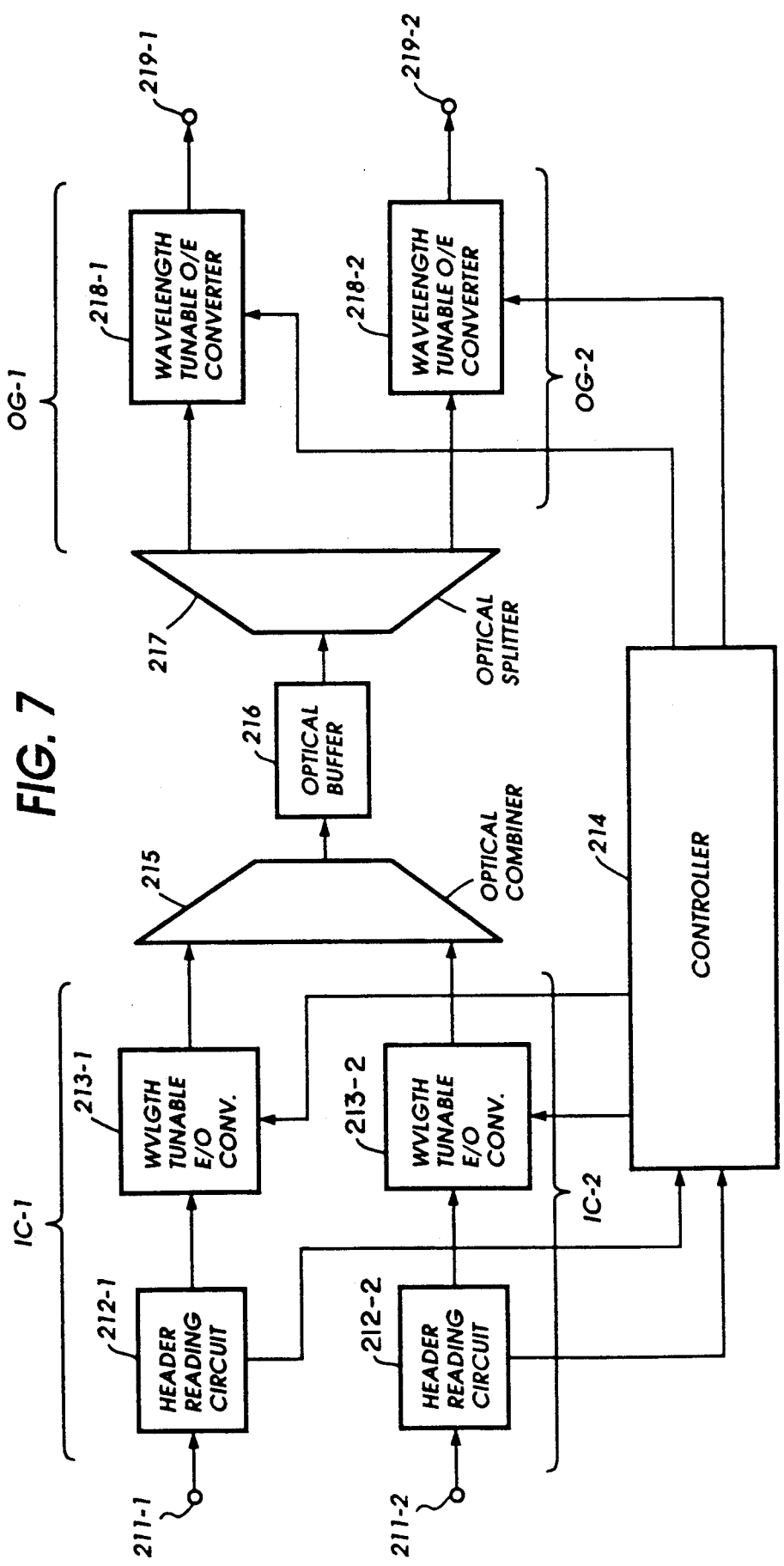
FIG. 7 is a block diagram of an optical packet switching system according to a third embodiment of the present invention.

FIG. 7 is a block diagram of a third embodiment of the present invention in which two incoming channels IC1, IC2 and two outgoing channels OG1 and OG2 are also provided as in the previous embodiments. Each of the incoming channels includes a header reading circuit 212 and a wavelength tunable electrooptic converter 213 and each outgoing channel includes a wavelength tunable optoelectric converter 218. Optical packet signals of different wavelengths are supplied from wavelength tunable E/O converters 213-1 and 213-2 and multiplexed by an optical combiner 215 and supplied to a common optical buffer 216 of identical construction to those described in the previous embodiments. The output of the common buffer 216 is split into two signals by an optical splitter 217 and supplied respectively to wavelength tunable O/E converters 218-1 and 219-2.

Controller 214 receives packet headers from header reading circuits 212-1 and 212-2 and supplies wavelength write-in signals to E/O converters 213-1 and 213-2 and wavelength read-out signals to O/E converters 218-1 and 218-2 in accordance with the destination addresses contained in the packet headers.

Figure 8:
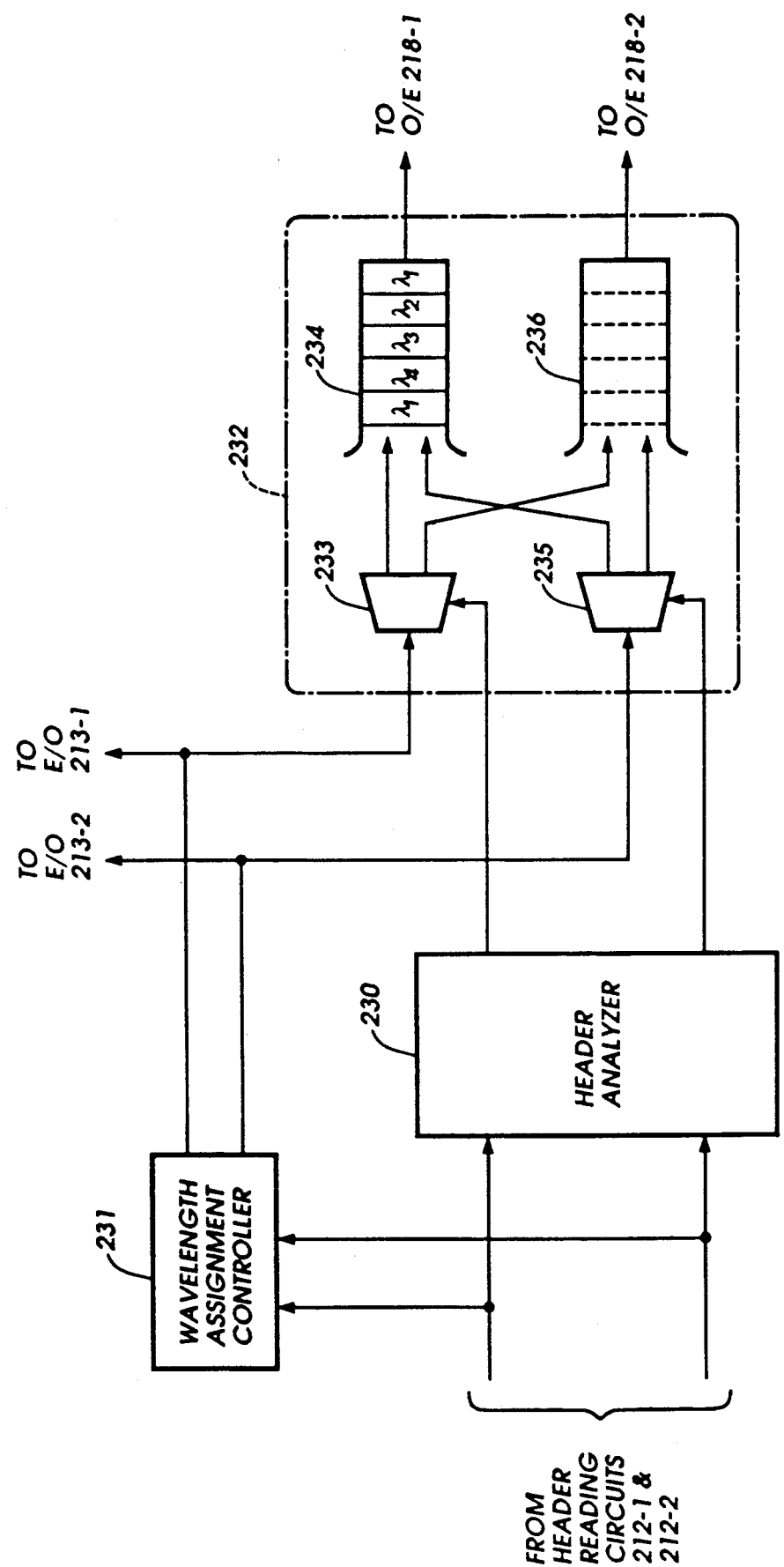
FIG. 8 shows details of the controller of FIG. 7.

As shown in FIG. 8, controller 214 includes a header analyzer 230, a wavelength assignment controller 231 and a packet scheduling circuit 232. Header analyzer 230 operates in the same manner as header analyzer 30 of the first embodiment. Wavelength assignment controller 231 has a wavelength management table which is mapped to record the busy/idle status of wavelengths commonly available for both the incoming and outgoing channels and assigns an idle wavelength to an incoming packet and applies a wavelength write-in signal $\lambda_i$ to switches 233 and 235 of packet scheduling circuit 232 as well as to wavelength tunable electrooptic converters 213-1 and 213-2. Switches 233 and 235 operate in the same manner as the switches 34 and 36 of the first embodiment to store the wavelength selection signals into buffers 234 and 236.

The operation of the third embodiment of the invention will be described with reference to FIG. 9. As in FIG. 3, it is also assumed that incoming packets P1, P3 and P5 arrived respectively on time slots T1, T2 and T4 at incoming line terminal 211-1 and packets P2 and P4 arrived respectively on time slots T1 and T2 at incoming line terminal 211-2, and all of these packets are destined to the outgoing channel OG1, and wavelength assignment controller 231 has assigned $\lambda_1$ to P1, $\lambda_2$ to P2, $\lambda_3$ to P3, $\lambda_4$ to P4 and $\lambda_1$ to P5. Wavelength tunable E/O converter 213-1 thus converts the incoming packets P1, P3 and P5 to optical packets of wavelengths $\lambda_1$, $\lambda_3$ and $\lambda_1$, respectively, and wavelength tunable E/O converter 213-2 converts the packets P2 and P4 to optical packets of wavelengths $\lambda_2$ and $\lambda_4$, respectively.

Figure 9:
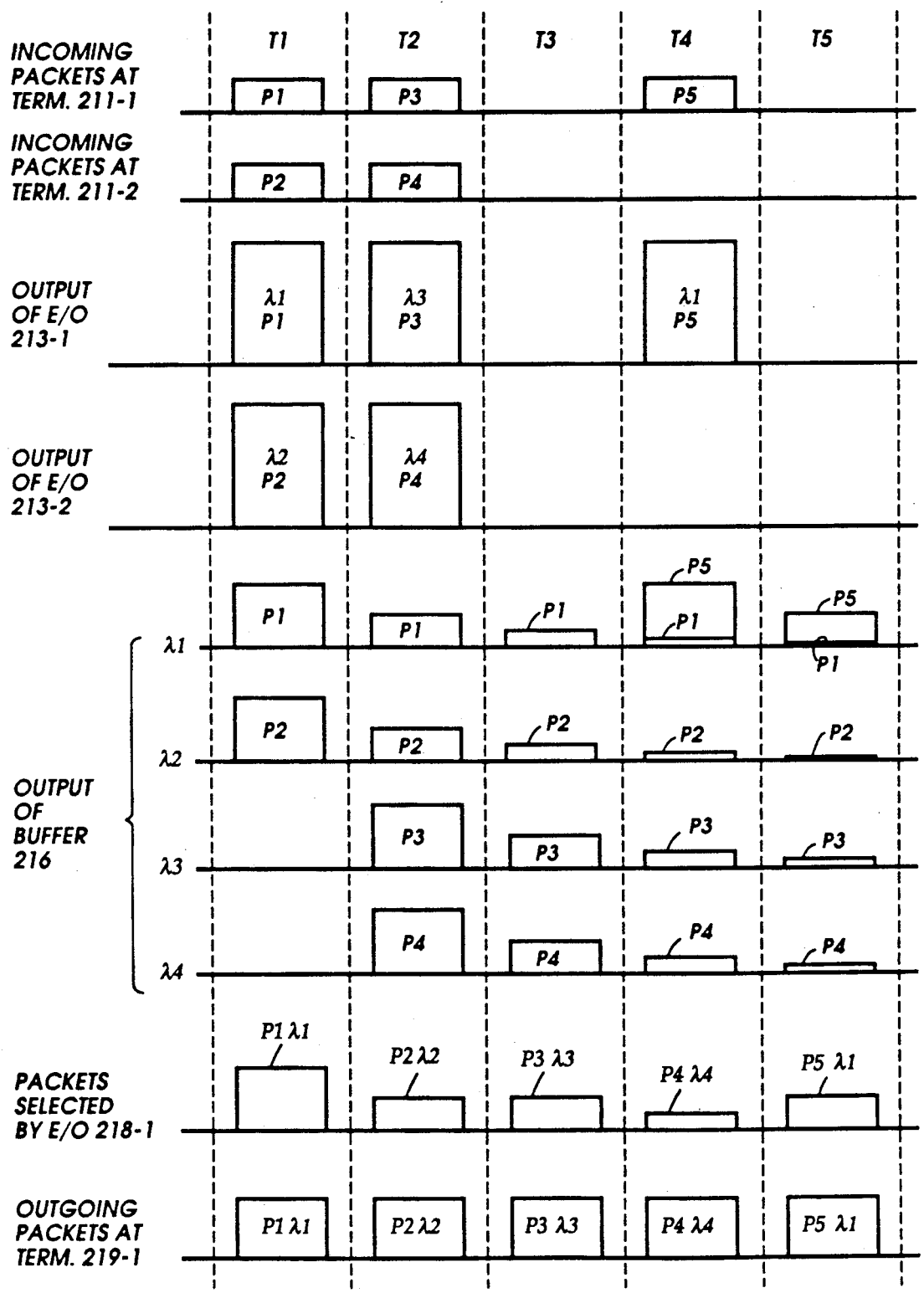
FIG. 9 is a timing diagram associated with the third embodiment.

Series of packets of wavelengths $\lambda_1$, $\lambda_2$, $\lambda_3$ and $\lambda_4$ appear at the output of the common optical buffer 216 as shown in FIG. 9. The wavelength $\lambda_1$ series contains copies of incident packet P1 on time slots T1 to T5 and copies of the incident packet P5 on time slots T4 and T5. As in the first embodiment, the first to fifth copies of P1 of $\lambda_1$ respectively have intensities ½ to 1/32 of that of the incident packet P1. The intensity of the first copy of P5 of $\lambda_1$ on T4 has one-half the incident intensity, but much higher than that of the fourth copy of P1 of $\lambda_1$ and the intensity of the second copy of P5 of $\lambda_1$ on T5 has ¼ of that of the incident intensity, but much higher than the intensity of the fifth copy of P1. The wavelength $\lambda_2$ series contains copies of the incident packet P2 on T1 through T5, the wavelength $\lambda_3$ series containing copies of packet P3 on T2 to T5 and the wavelength $\lambda_4$ series containing copies of packet P4 on T2 to T5.

Wavelength selection signals $\lambda_1$, $\lambda_2$, $\lambda_3$, $\lambda_4$ and $\lambda_1$ are sequentially stored into the first to fifth time slot positions of buffer 234 and sequentially forwarded to tunable O/E converter 218-1 as shown in FIG. 8. As a result, packets P1 of $\lambda_1$, P2 of $\lambda_2$, P3 of $\lambda_3$, P4 of $\lambda_4$ and P5 of $\lambda_1$ are selected by the converter 218-1 in sequence from time slots T1 to T5 at the input thereof and converted to electrical packet signals and appropriately amplified so that they have equal amplitudes at outgoing line terminal 219-1.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An optical packet switching system having incoming line terminals for receiving incoming packets, respectively, and outgoing line terminals, each of said incoming packets being destined to one of said outgoing line terminals, comprising:

a wavelength selection stage connected to said incoming line terminals for selecting a wavelength parameter from a plurality of wavelength parameters according to the destination of each of said incoming packets, said wavelength selection stage including a wavelength tunable device for converting said incoming packet to an optical packet having a wavelength corresponding to said selected wavelength parameter, said wavelength selection stage multiplexing a plurality of such optical packets to generate a wavelength and time division multiplexed (WTDM) signal in response to receipt of a plurality of said incoming packets;

an optical buffer for storing said WTDM signal; and a wavelength detection stage connected between said optical buffer and said outgoing line terminals for rearranging a plurality of said selected wavelength parameters according to the destinations of incoming packets, said wavelength detection stage including a wavelength tunable device for detecting optical packets from said stored WTDM signal in accordance with the rearranged wavelength parameters so that each of the optical packets detected by said wavelength tunable device appears at one of said outgoing line terminals according to the destination of the corresponding incoming packet.

2. An optical packet switching system as claimed in claim 1, wherein said optical buffer comprises:

an optical coupler having first and second optically coupled waveguides, said first waveguide being adapted to receive said WTDM signal; and an optical loop connected between opposite ends of said second waveguide to permit a portion of said WTDM signal travelling through said first waveguide to be coupled to and recirculate through said loop and appear at the other end of said first waveguide, said optical loop introducing a delay time of an integral multiple of the unit length of said optical packet.

3. An optical packet switching system comprising:
a plurality of incoming line terminals and a plurality of outgoing line terminals;
a plurality of first wavelength tunable devices associated respectively with said incoming line terminals for generating an optical packet of a selected wavelength in response to receipt of an incoming signal at said incoming line terminals, said desired wavelength being determined by a first wavelength selection signal;
an optical space division switch having input ports connected respectively to outputs of said first wavelength tunable devices for establishing one or more optical paths from said input ports to one of a plurality of output ports in response to a path selection signal;
a plurality of optical buffers connected respectively to said output ports of said optical space division switch for storing wavelength division multiplexed packets;
a plurality of second wavelength tunable devices connected respectively to outputs of said optical buffers for detecting an optical packet of a desired wavelength from the stored wavelength multiplexed packets in accordance with a second wavelength selection signal and supplying the detected packet to said outgoing line terminals; and
control means for generating said first and second wavelength selection signals and said path selection signal in accordance with a destination address contained in said incoming signal.

4. An optical packet switching system as claimed in claim 3, wherein each of said optical buffers comprises:
an optical coupler having first and second optically coupled waveguides, said first waveguide being connected at one end thereof to said optical space division switch and connected at the other end thereof to the input of an associated one of said second wavelength tunable devices; and
an optical loop connected between opposite ends of said second waveguide to permit copies of a packet travelling through said first waveguide to recirculate through said loop and appear at said other end of said first waveguide, said optical loop introducing a delay time of an integral multiple of the unit length of said packet.

5. An optical packet switching system as claimed in claim 3, wherein said control means comprises:
means for detecting said destination address from said incoming signal and determining which one of said outgoing line terminals the incoming signal is destined to;
means for selecting a particular wavelength parameter from a plurality of wavelength parameters in accordance with the determined outgoing line terminal and generating said first wavelength selection signal representative of said selected wavelength parameter;
means for determining a path in said space division switch in accordance with said detected destination address and generating said path selection signal representative of said determined path;
a plurality of buffer means associated respectively with said second wavelength tunable devices; and
means for storing said first wavelength selection signal into one of said buffer means depending on the determined outgoing line terminal and forwarding the stored first wavelength selection signal to the associated second wavelength tunable devices as said second wavelength selection signal.

6. An optical packet switching system comprising:
a plurality of incoming line terminals and a plurality of outgoing line terminals;
a plurality of first wavelength tunable devices associated respectively with said incoming line terminals for generating an optical packet of a selected wavelength in response to receipt of an incoming signal at said incoming line terminals, said desired wavelength being determined by a first wavelength selection signal;
a plurality of optical buffers respectively connected to outputs of said first wavelength tunable devices for storing wavelength division multiplexed packets;
a plurality of second wavelength tunable devices connected respectively to outputs of said optical buffers for detecting an optical packet of a desired wavelength from said stored wavelength division multiplexed packets, the wavelength of said detected optical packet being determined by a second wavelength selection signal;
an optical space division switch for establishing one or more optical paths from outputs of said second wavelength tunable devices to said outgoing line terminals in response to a path selection signal; and
control means for generating said first and second wavelength selection signals and said path selection signal in accordance with a destination address contained in said incoming signal.

7. An optical packet switching system as claimed in claim 6, wherein each of said optical buffers comprises:
an optical coupler having first and second optically coupled waveguides, said first waveguide being connected at one end thereof to the output of an associated one of said first wavelength tunable devices and connected at the other end thereof to the input of an associated one of said second wavelength tunable devices; and
an optical loop connected between opposite ends of said second waveguide to permit copies of a packet travelling through said first waveguide to be coupled to and recirculate through said loop and appear at said other end of said first waveguide, said optical loop introducing a delay time of an integral multiple of the unit length of said packet.

8. An optical packet switching system as claimed in claim 6, wherein said control means comprises:
means for detecting said destination address from each of said incoming signal and determining which one of said outgoing line terminals the incoming signal is destined to;
means for determining which one of said incoming line terminals the incoming signal has arrived at and selecting a particular wavelength parameter from a plurality of wavelength parameters in accordance with the determined incoming line terminal and generating said first wavelength selection signal representative of said selected wavelength parameter;
a plurality of first buffer means for storing a signal identifying the determined outgoing line terminal;
a plurality of second buffer means respectively associated with said second wavelength tunable devices for storing said first wavelength selection signal in a position corresponding to a position of said first buffer means in which said identifying signal is stored;

means for detecting that two or more of said identifying signals are stored in corresponding positions of said first buffer means and selecting one of said identifying signals and forwarding said first wavelength selection signal as said second wavelength selection signal to the associated second wavelength tunable device from a position of said second buffer means corresponding to the position of said first buffer means in which said selected identifying signal is stored; and means for determining a path in said space division switch in response to said selected identifying signal and generating said path selection signal representative of the determined path.

9. An optical packet switching system comprising:

a plurality of incoming line terminals and a plurality of outgoing line terminals;

a plurality of first wavelength tunable devices associated respectively with said incoming line terminals for generating an optical packet of a selected wavelength in response to receipt of an incoming signal at said incoming line terminals, said desired wavelength being determined by a first wavelength selection signal;

means for combining output packets from said first wavelength tunable devices to produce a wavelength division multiplexed packets;

an optical buffer for storing said wavelength division multiplexed packets;

means for splitting the output of said optical buffer into a plurality of optical paths;

a plurality of second wavelength tunable devices connected respectively to said optical paths for detecting a packet of a desired wavelength from the stored wavelength division multiplexed packets and supplying said detected packet to said outgoing line terminals, the wavelength of said detected packet being determined by a second wavelength selection signal; and control means for generating said first and second wavelength selection signals and said path selection signal in accordance with a destination address contained in said incoming signal.

10. An optical packet switching system as claimed in claim 9, wherein said optical buffer comprises:

an optical coupler having first and second optically coupled waveguides, said first waveguide being connected at one end thereof to the output of said combining means and connected at the other end thereof to the input of said splitting means; and an optical loop connected between opposite ends of said second waveguide to permit copies of a packet travelling through said first waveguide to be coupled to and recirculate through said loop and appear at said other end of said first waveguide, said optical loop introducing a delay time of an integral multiple of the unit length of said packet.

11. An optical packet switching system as claimed in claim 9, wherein said control means comprises:

means for detecting said destination address from said incoming signal and determining which one of said outgoing line terminals the incoming signal is destined to;

means for selecting a wavelength parameter from a plurality of wavelength parameters and generating said first wavelength selection signal representative of said selected wavelength parameter;

a plurality of buffer means associated respectively with said second wavelength tunable devices; and means for storing said first wavelength selection signal into one of said buffer means depending on the determined outgoing line terminal and forwarding the stored signal to the associated second wavelength tunable devices as said second wavelength selection signal.

12. An optical packet switching system comprising:

a wavelength selection stage for selecting a wavelength parameter from a plurality of wavelength parameters according to a destination of each one of a plurality of incoming packets, said wavelength selection stage including a wavelength tunable device for converting the incoming packet to an optical packet having a wavelength corresponding to said selected wavelength parameter, said wavelength selection stage multiplexing a plurality of such optical packets to generate a wavelength and time division multiplex (WTDM) signal;

an optical coupler having first and second optically coupled waveguides, said first waveguide being adapted to receive said WTDM signal;

an optical loop connected between opposite ends of said second waveguide to permit portion of said WTDM signal travelling through said first waveguide to be coupled to and recirculate through said loop and appear at the other end of said first waveguide, said optical loop introducing a delay time of an integral multiple of the unit length of said optical packet; and a wavelength detection stage for rearranging a plurality of said selected wavelength parameters according to the destinations of said incoming packets, said wavelength detection stage including a wavelength tunable device for detecting optical packets from said stored WTDM signal in accordance with the rearranged wavelength parameters.

* * * * *